(12) United States Patent
Kirchhoff et al.

(10) Patent No.: US 11,697,223 B2
(45) Date of Patent: Jul. 11, 2023

(54) EXTRUDER SYSTEM WITH PRESSURE REGULATING DEVICE

(71) Applicant: ARLANXEO DEUTSCHLAND GMBH, Dormagen (DE)

(72) Inventors: Jörg Kirchhoff, Cologne (DE); Thomas König, Leverkusen (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 691 days.

(21) Appl. No.: 16/629,468

(22) PCT Filed: Jul. 6, 2018

(86) PCT No.: PCT/EP2018/068379
§ 371 (c)(1),
(2) Date: Jan. 8, 2020

(87) PCT Pub. No.: WO2019/011807
PCT Pub. Date: Jan. 17, 2019

(65) Prior Publication Data
US 2020/0139581 A1    May 7, 2020

(30) Foreign Application Priority Data

Jul. 10, 2017    (EP) .................................. 17180511

(51) Int. Cl.
*B29B 7/84*    (2006.01)
*B29B 7/42*    (2006.01)
(Continued)

(52) U.S. Cl.
CPC ................ *B29B 7/845* (2013.01); *B29B 7/42* (2013.01); *B29B 7/72* (2013.01); *B29B 7/801* (2013.01)

(58) Field of Classification Search
CPC .. B29B 7/845; B29B 7/42; B29B 7/72; B29B 7/801; B29B 7/7461; B29B 7/7466;
(Continued)

(56) References Cited

U.S. PATENT DOCUMENTS 1,599,274 A * 9/1926 Bicknell et al. ...... B29C 48/385
                                                                425/422
3,917,507 A * 11/1975 Skidmore ............. B29C 48/762
                                                                264/102

(Continued)

FOREIGN PATENT DOCUMENTS

DE         3703758 A1     8/1987
DE    102013008202 A1    12/2014
(Continued)

OTHER PUBLICATIONS

Machine translation for Jp 2003291201A Oct. 2003.*
(Continued)

*Primary Examiner* — Charles Cooley
(74) *Attorney, Agent, or Firm* — The Dobrusin Law Firm. P.C.

(57) ABSTRACT

An extruder system for degassing a mixture, comprising a first extruder, a second extruder arranged downstream of the first extruder and a transfer zone formed between these extruders, characterized by a pressure regulating device which can regulate the pressure at the outlet of the first extruder.

12 Claims, 2 Drawing Sheets

(51) Int. Cl.
  *B29B 7/72* (2006.01)
  *B29B 7/80* (2006.01)

(58) Field of Classification Search
  CPC ..... B29B 7/48; B29C 48/2552; B29C 48/268;
  B29C 48/385; B29C 48/76
  See application file for complete search history.

(56) References Cited

U.S. PATENT DOCUMENTS

| | | | | |
|---|---|---|---|---|
| 3,963,558 | A * | 6/1976 | Skidmore | B29C 48/76 |
| | | | | 264/102 |
| 4,746,478 | A * | 5/1988 | Fujisaki | B29C 44/3442 |
| | | | | 366/280 |
| 4,765,745 | A * | 8/1988 | Strecker | B29B 7/94 |
| | | | | 366/86 |
| 4,767,303 | A * | 8/1988 | Sakakura | B29C 48/38 |
| | | | | 425/205 |
| 5,080,845 | A * | 1/1992 | Herrmann | B29C 48/55 |
| | | | | 264/141 |
| 5,102,594 | A * | 4/1992 | Burlet | B29C 48/766 |
| | | | | 159/2.3 |
| 5,165,941 | A * | 11/1992 | Hawley | B29C 31/08 |
| | | | | 425/327 |
| 5,804,111 | A * | 9/1998 | Kobayashi | B29C 48/57 |
| | | | | 425/149 |
| 6,024,479 | A * | 2/2000 | Haring | B29C 48/405 |
| | | | | 366/85 |
| 2003/0098530 | A1 * | 5/2003 | Inoguchi | C04B 35/6263 |
| | | | | 264/630 |
| 2006/0108706 | A1 * | 5/2006 | Galimberti | B29C 48/37 |
| | | | | 425/204 |
| 2006/0240133 | A1 * | 10/2006 | Munz | B29C 48/40 |
| | | | | 425/205 |
| 2007/0104814 | A1 * | 5/2007 | Munz | B29C 48/266 |
| | | | | 425/204 |
| 2008/0290537 | A1 * | 11/2008 | Bacher | B29B 7/603 |
| | | | | 264/37.1 |
| 2009/0004325 | A1 * | 1/2009 | Bacher | B29C 48/285 |
| | | | | 425/586 |
| 2009/0065965 | A1 * | 3/2009 | Bowen | B29C 48/2886 |
| | | | | 425/112 |
| 2011/0182132 | A1 * | 7/2011 | Lechner | B29B 7/60 |
| | | | | 366/76.6 |
| 2015/0203600 | A1 | 3/2015 | Kirchhoff et al. | |
| 2015/0218335 | A1 * | 8/2015 | Kirchhoff | B29C 48/2517 |
| | | | | 366/75 |
| 2016/0114515 | A1 * | 4/2016 | Asai | B29C 48/385 |
| | | | | 425/208 |
| 2020/0139581 | A1 * | 5/2020 | Kirchhoff | B29B 7/7461 |

FOREIGN PATENT DOCUMENTS

| | | | | |
|---|---|---|---|---|
| EP | 0371230 | A1 | | 6/1990 |
| EP | 0683028 | A1 | | 11/1995 |
| FR | 2483842 | A1 * | 12/1981 | |
| JP | 05038738 | A * | 2/1993 | ........... B29C 45/542 |
| JP | 05050486 | A * | 3/1993 | ........... B29C 47/025 |
| JP | 06328449 | A * | 11/1994 | |
| JP | 2002273777 | A * | 9/2002 | ........... B29C 48/362 |
| JP | 2003291201 | A * | 10/2003 | ........... B29C 48/385 |
| JP | 2005022245 | A * | 1/2005 | ............. B29C 48/37 |
| WO | 2013/045623 | A1 | | 4/2013 |

OTHER PUBLICATIONS

International Search Report and Written Opinion, PCT Application No. PCT/EP2018/068379 dated Sep. 13, 2018.
International Preliminary Report on Patentability, PCT Application No. PCT/EP2018/068379 dated Jan. 14, 2020.

* cited by examiner

EXTRUDER SYSTEM WITH PRESSURE REGULATING DEVICE

FIELD

The invention relates to an extruder system.

BACKGROUND

Extruders can basically be differentiated into two types, which differ in the process principles. Processing extruders are mainly used for shaping (usually single-shaft extruders), while processing extruders are used for chemical and/or physical modification (reacting, mixing, degassing, etc.) of substances (co-operating, tightly meshing twin-screw extruder, bus kneader, etc.).

One form of processing extruders are so-called degassing extruders, which are used in particular for the degassing of polymers and especially of elastomers.

The degassing process is regularly divided into several stages. The volatile components such as e.g. Solvents, residual monomers or water are removed up to a residual volatile content of approx. 5 percent to 40 percent. This mixture of product and residual volatiles is heated in the first extruder by the input of mechanical energy. A slightly volatile entrainer can also be added. As an entrainer e.g. Nitrogen, carbon dioxide or water or mixtures thereof can be used. The mixture of product, residual volatiles and optionally entrainer is then conveyed into a second extruder, with the mixture being further degassed in the second extruder. A so-called transfer zone, i.e. the formation of the transition from the first to the second extruder. This is in particular designed so that when the second extruder enters the mixture, the mixture relaxes, which has a positive effect on the degassing.

SUMMARY

Based on this prior art, the object of the invention was to further improve the degassing in a generic extruder system.

This object is achieved by an extruder system according to the independent patent claim. Advantageous embodiments of the extruder system according to the invention are the subject of the dependent claims and result from the following description of the invention.

A generic extruder system for degassing a mixture with (at least) a first extruder, (at least) a second extruder arranged downstream of the first extruder and (at least) a transfer zone formed between them, is characterized according to the invention by (at least) one pressure control device by which the pressure at the discharge of the first extruder, ie can be regulated when entering the transfer zone.

The pressure control device can be used to set the energy input and thus the temperature of the mixture, a higher pressure being able to bring about a higher temperature of the mixture and a higher temperature leading to improved degassing.

It is preferably provided that the pressure is only set so high that the volatile constituents contained in the mixture do not boil. The same can apply to water which may be present, the boiling temperature of which can be raised above the prevailing temperatures by the increased pressure. This can prevent the water from boiling. Furthermore, high pressure can disperse limited soluble entraining agents, e.g. Improve nitrogen or carbon dioxide.

In a preferred embodiment of the extruder system according to the invention it can also be provided that the pressure control device is controlled in such a way that the pressure at the discharge of the first extruder is greater than in a degassing zone of the second extruder which adjoins the transfer zone. As a result, the mixture is relaxed, in particular when it enters the second extruder. As a result of this expansion, in particular in conjunction with the temperature increase caused by the pressure increase in the transfer zone, the boiling pressure of the mixture can be fallen below, which can lead to effective degassing of the mixture. Furthermore, the expansion of the mixture can result in a foam being generated as a result of an expansion of the remaining volatile constituents and any entraining agents present, which promotes degassing due to a large surface area.

The expansion of the volatile constituents can preferably be supported by the fact that within the second extruder (at least in the area of the degassing zone) the greatest possible negative pressure is generated in relation to the (transfer) pressure in the transfer zone. The pressure in the degassing zone can preferably also be below atmospheric pressure. A vacuum (in particular between 50 mbar and 900 mbar (absolute pressure)) can be generated particularly preferably in the transfer zone.

Since conventional degassing processes, in particular from polymers, are often limited by the available surface of the mixture, in a further preferred embodiment of the extruder system according to the invention, means for enlarging the free surface of the mixture passed through the transfer zone can be provided. These can be provided particularly preferably at the discharge of the transfer zone.

The means for enlarging the surface can preferably have a perforated plate with a multiplicity of passage openings, through which the mixture passed through the transfer zone is divided into several partial streams.

Another possibility for enlarging the surface can provide that the mixture is passed through one or more slot nozzles in the transfer zone or when entering the degassing zone of the second extruder. These slotted nozzles are characterized by large surface-to-volume ratios, which are preferably achieved in that the nozzle openings are slit-shaped with a length that is a multiple of the width.

Of course, both measures can also be combined, i.e. By means of a perforated plate with a plurality of slot-shaped through openings (slot nozzles), both a division of the mixture into several streams and the largest possible surface area for the individual streams of the mixture can be achieved.

To avoid product deposits and to improve the removal of volatile constituents, it can further be provided that the second extruder (preferably vertically) is arranged above (based on the direction of gravity) the first extruder. This allows rapid or direct removal of the degassed mixture from the transfer zone and, at the same time, a largely free gas space in the degassing zone above the degassed mixture, through which the volatile constituents can be easily removed. The removal of the volatile constituents can be further improved if the degassing zone of the second extruder which adjoins the transfer zone (at least) has a degassing outlet which leads upward in relation to the direction of gravity (preferably perpendicularly). The mixture and the degassed constituents can be carried out in counterflow, crossflow and/or cocurrent. This configuration of the extruder system according to the invention enables the volatile constituents to be effectively separated from the degassed mixture; entrainment of particles of the degassed mixture can be largely avoided by the special guidance of the mixture and the volatile components.

In another embodiment of the extruder system according to the invention, an effective separation of the degassed mixture from the volatile constituents can be achieved by arranging the second extruder below the first extruder in relation to the direction of gravity 14 (preferably perpendicularly) and in one a degassing opening which leads to the transfer zone of the second extruder (at least) and which leads to the side in relation to the direction of gravity (preferably horizontally) is provided.

In a further preferred embodiment of the extruder system according to the invention, (at least) one closable outlet for discharging the mixture can be provided in the region of the transfer zone. This can be used, in particular, to take part of the mixture as a sample as part of a process control. Part of the mixture can also be removed through the closable outlet before it is transferred to the second extruder. This can be particularly advantageous when starting up or emptying the first extruder.

It can preferably be provided that the outlet can be closed by means of the pressure regulating device, the pressure regulating device preferably comprising (at least) a slide valve for this purpose, which by means of a relative movement (translation or rotation) of a valve body either (at least) one The opening of the transfer zone or the outlet through which part of the mixture can be removed more or less closes. In particular, the slide valve can be a (rotary) piston valve.

In a further preferred embodiment of the extruder system according to the invention, it can be provided that an extruder screw of the first extruder can be driven or driven at a higher angular speed than an extruder screw of the second extruder. Due to the relatively high rotational speed of the first extruder, a correspondingly high energy input into the mixture can be achieved with the aim of increasing the temperature and thereby degassing.

In particular, in such an embodiment of the extruder system it can also be provided that the average volume cross section of the first extruder is smaller than the average volume cross section of the second extruder. Due to the relatively large volume cross section of the second extruder, on the one hand the mechanical energy input can be kept low and on the other hand a comparatively large gas space can be provided.

The extruder system according to the invention is particularly suitable for degassing polymers and in particular elastomers.

The invention is explained in more detail below on the basis of an exemplary embodiment shown in the drawings.

DETAILED DESCRIPTION

Figure 1:
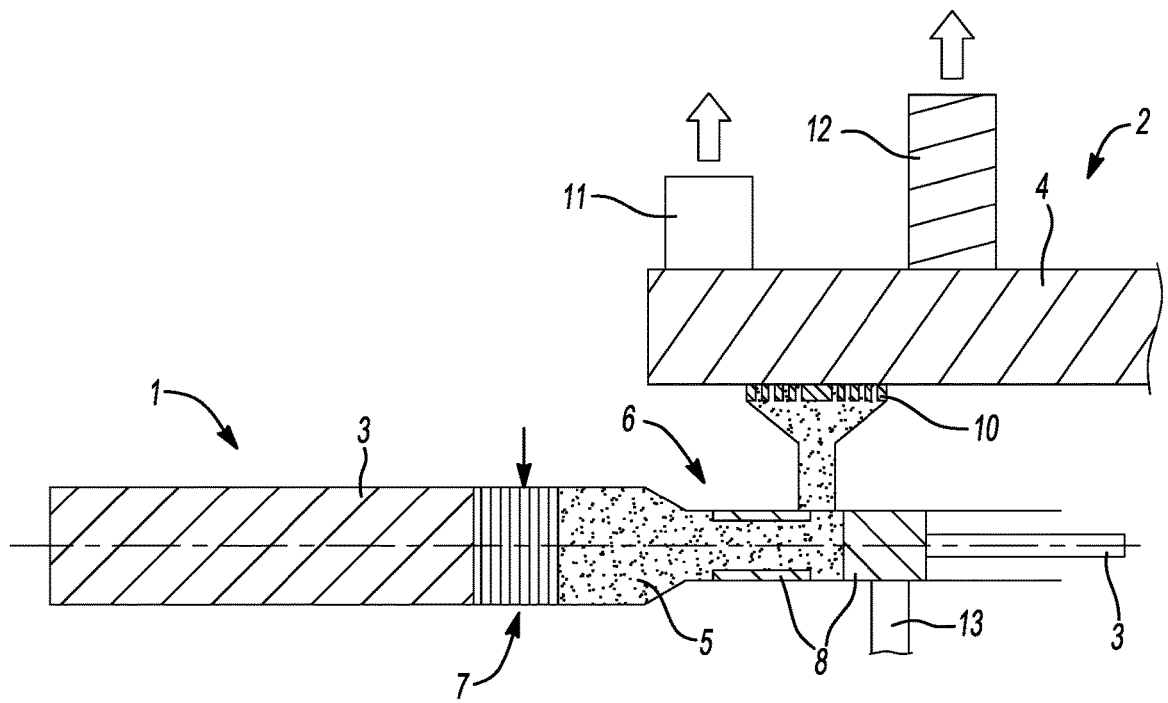
FIG. 1 is a schematic side view of an embodiment of an extruder system according to the invention in a first functional position.
Figure 2:
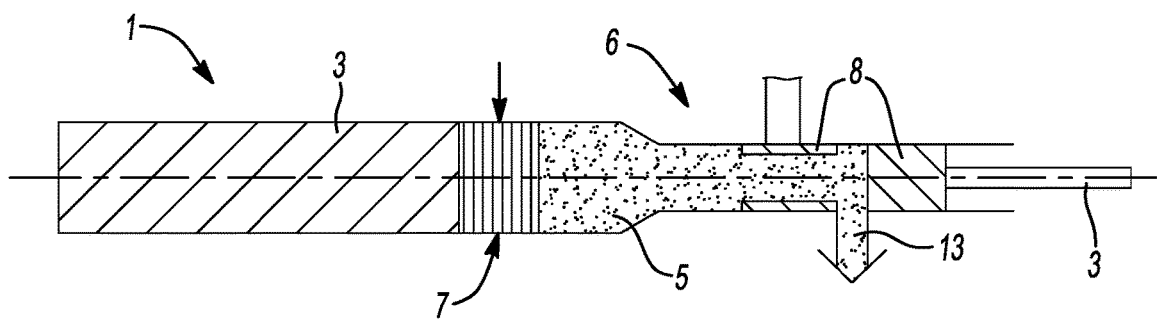
FIG. 2: is a schematic side view of a portion of the extruder system according to FIG. 1 in a second functional position.
Figure 3:
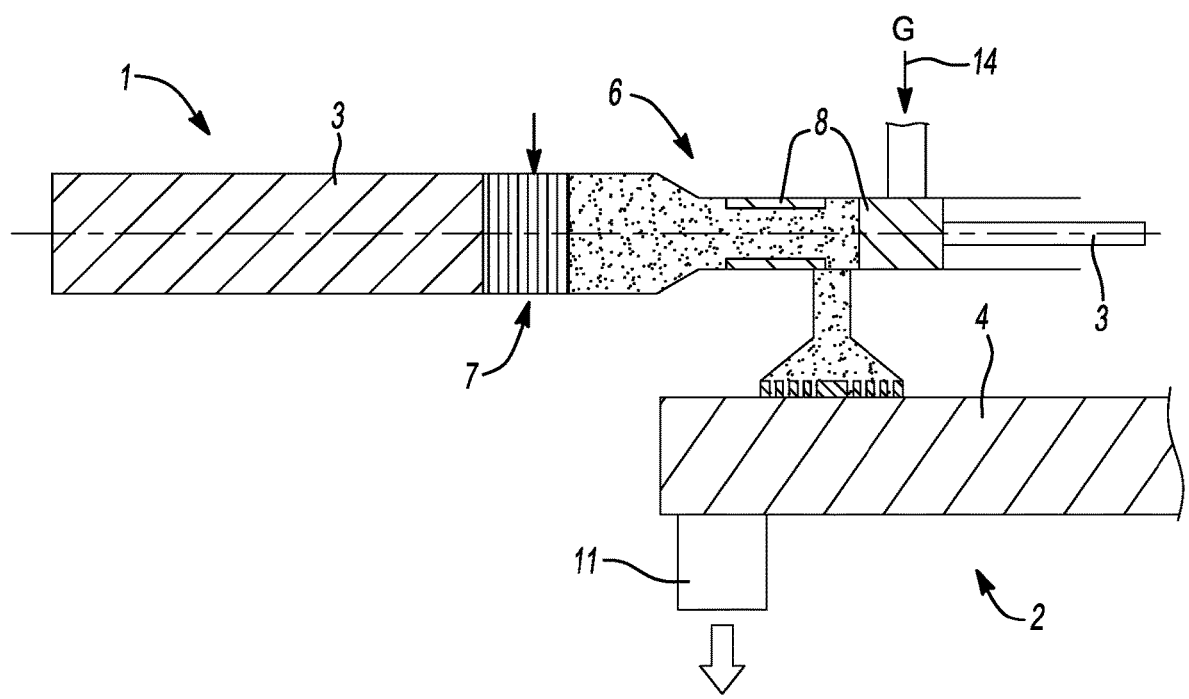
FIG. 3 is a schematic side view of an embodiment of an extruder system where the second extruder is arranged below the first extruder according to the invention in a first functional position.

The extruder system shown in FIGS. 1 and 2 is used for the degassing of polymers and comprises a first extruder 1 and a second extruder 2 downstream of the first extruder 1.

The extruders 1, 2 each comprise one or a plurality of extruder screws 3, 4, which are rotatably driven by a drive (not shown) and are mounted in extruder housings.

In the annular product spaces formed between the extruder screws 3, 4 and the extruder housings, a (product) mixture 5 is transported by the rotation of the extruder screws 3, 4 formed with spiral-shaped gears. Degassing takes place.

In the first extruder 1, volatile constituents, such as in particular solvents, residual monomers or water, are removed up to a residual volatile content of approximately 5 percent to 40 percent. The mixture 5 of the product (the polymer) and the volatile constituents is heated by the input of mechanical energy and—in connection with a pressure control device to be explained in a transfer zone 6 between the two extruders 3, 4—is compressed.

In a dispersing zone 7 which adjoins the rear end of the extruder screw 3, a slightly volatile entrainer is added to the mixture. This can e.g. are nitrogen or carbon dioxide.

The mixture 5 then flows, moving through the extruder screw 3 of the first extruder 1, into the transfer zone 6. The pressure increase caused by the extruder 1 is set such that the pressure at the discharge of the extruder 1 is at least as high that the volatile constituents contained in the mixture 5 do not boil. The transfer zone 6 is a line system through which the mixture 5 is transferred in a controlled manner from the first extruder 1 to the second extruder 2. The transfer zone 6 comprises a first pipeline part, which adjoins the rear end of the first extruder 1 in the longitudinal axial direction, and a second pipeline part, which adjoins the first pipeline part (with respect to its longitudinal axis) in a radial direction. The transition opening from the first to the second pipeline part can be more or less closed by means of a pressure control device in the form of a slide valve. For this purpose, a valve body 8 is displaced by means of a piston 9 from a drive device, not shown, within the first pipe part.

The overflow of the mixture from the first extruder 1 into the second extruder 2 is accompanied by a pressure drop which, on the one hand, results in a reduction in the volume cross section of the first pipeline part in comparison to the first extruder 1 and a narrowing of the free cross section of the transition opening which may have been set partial concealment by means of the valve body 8 is justified. On the other hand, a funnel-shaped widening of a section of the second pipe part is provided.

At the rear end of the funnel-shaped widening, a perforated plate 10 is provided which has a multiplicity of openings through which the mixture 5 is pressed. The flow of the mixture 5 is divided into a plurality of substreams. The partial flows are distinguished by a significantly larger surface area to volume ratio compared to the total flow prevailing in front of the perforated plate 10. This large surface-to-volume ratio in turn has a positive influence on the escape of the volatile constituents from the mixture 5 and thus its degassing.

The partial flows of the mixture 5 enter a degassing zone of the second extruder 2. The mixture 5 foams due to expansion of the volatile constituents, which in turn leads to an enlargement of the surface and thus to an improvement in the degassing. This rather abrupt expansion of the volatile components is brought about by the relatively large difference between the pressure in the degassing zone of the second extruder 2 and the pressure in the second pipeline part of the transfer zone 6. For this purpose, the atmosphere is largely evacuated within the second extruder 2.

The first extruder is, based on the direction of gravity, below the second extruder. The mixture 5 is thus introduced into the second extruder 2 from below and in a direction radial to the extruder screw 4 of the second extruder 2. This means that the mixture 5 is arranged almost exclusively in the lower section of the degassing zone of the second extruder 2 and is discharged from there directly by means of the extruder screw 4. As a result, a gas space remains in the upper section of the degassing zone, which is largely free of the mixture 5 and through which the volatile constituents can be easily removed. The volatile constituents are removed on the one hand via a degassing outlet 11, which is provided at the rear end in the direction of flow of the degassed mixture 5 and therefore also behind the area in which the mixture 5 is introduced into the second extruder 2. The degassing outlet 11 extends in a vertical, radial direction from the housing of the second extruder 2. This arrangement of the degassing outlet 11 causes the volatile constituents to flow in a direction opposite to the main flow direction of the mixture 5.

In the extruder system shown, it is provided to carry out a further degassing by means of a so-called stuffing screw 12 in the further course of the second extruder 2.

The first pipeline part of the transfer zone also comprises an outlet 13, through which a part of the mixture 5 can be discharged. This can be done, in particular, for taking a sample as part of a process control. In normal operation of the extruder system, the outlet 13 is closed by the valve body 8 of the pressure control device. To take the sample, the valve body 8 is moved so far that a connection between the outlet 13 and the part of the first pipeline part of the transfer zone 6 receiving the mixture 5 is established via an axial and a transverse bore of the valve body 8. In this case, the transition opening from the first to the second pipe part of the transfer zone 6 is closed by means of a wall section of the valve body 8 (FIG. 2).

The transfer zone may include a first pipeline part arranged parallel to the first extruder and positioned downstream of the first extruder, such as illustrated in FIG. 1. the transfer zone may include a second pipeline part arranged perpendicular to the first pipeline part and positioned between the first pipeline part and the second extruder, such as illustrated in FIG. 1. The pressure control device includes a slide valve within the first pipeline part which narrows an opening from the first pipeline part to the second pipeline part, such as illustrated in FIG. 1.

REFERENCE CHARACTER LIST

1 Extruder
2 Extruder
3 Extruder screw
4 Extruder housing
5 Mixture
6 Transfer zone
7 Dispersion zone
8 Valve body
9 Piston
10 Perforated plate
11 Degassing outlet
12 Darning screw
13 Outlet
14 Direction of gravity

What is claimed is:

1. An extruder system for degassing a mixture comprising:
   a first extruder,
   a second extruder arranged above the first extruder in relation to a gravitational direction and downstream of the first extruder, and
   a transfer zone formed between the first and second extruders;
   characterized by a pressure control device by which the pressure of the mixture at the discharge of the first extruder can be regulated;
   wherein the extruder system comprises a means for increasing a surface of the mixture passed through the transfer zone;
   wherein the transfer zone includes a first pipeline part arranged parallel to the first extruder and positioned downstream of the first extruder and a second pipeline part arranged perpendicular to the first pipeline part and positioned between the first pipeline part and the second extruder, wherein the pressure control device includes a slide valve within the first pipeline part which narrows an opening from the first pipeline part to the second pipeline part.

2. The extruder-system according to claim 1, characterized in that the pressure control device is controlled in such a way that the pressure of the mixture at the discharge of the first extruder is greater than in a degassing zone of the second extruder adjoining the transfer zone.

3. The extruder system of claim 1, wherein the means for increasing a surface comprises a perforated plate through which the mixture guided through the transfer zone is divided into several partial streams.

4. The extruder system of claim 1, wherein the means for increasing a surface comprises one or more slot nozzles in the transfer zone, wherein the mixture is passed through the one or more slot nozzles.

5. The extruder system according to claim 4, characterized in that the pressure control device is controlled in such a way that the pressure of the mixture at the discharge of the first extruder is greater than in a degassing zone of the second extruder adjoining the transfer zone.

6. The extruder system according to claim 5, wherein the means for increasing a surface comprises a perforated plate through which the mixture guided through the transfer zone is divided into several partial streams.

7. The extruder system according to claim 1, characterized in that in a degassing zone of the second extruder adjoining the transfer zone there is provided a degassing outlet in relation to the gravitational direction.

8. The extruder system according to claim 1, characterized in that a closable outlet is provided in the region of the transfer zone for the discharge of the mixture.

9. The extruder system according to claim 8, characterized in that the outlet can be closed by means of the pressure control device.

10. The extruder system according to claim 9, characterized in that the pressure control device comprises a slide valve.

11. The extruder system according to claim 1, characterized in that a volume cross section of the first extruder is smaller than a volume cross section of the second extruder.

12. The extruder system according to claim 1, characterized in that an extruder screw of the first extruder can be driven at a higher angular velocity than an extruder screw of the second extruder.

* * * * *